United States Patent
Kmita et al.

(10) Patent No.: US 6,409,063 B1
(45) Date of Patent: Jun. 25, 2002

(54) VEHICLE ARTICLE CARRIER HAVING ANGLED TAP PLATE AND COOPERATING SLAT

(75) Inventors: Gerard J. Kmita, Allen Park; Milton J. Antonick, Royal Oak; Brett J. Borella, Bloomfield Hills, all of MI (US)

(73) Assignee: JAC Products, Inc., Ann Arbor, MI (US)

( * ) Notice: Subject to any disclaimer, the term of this patent is extended or adjusted under 35 U.S.C. 154(b) by 11 days.

(21) Appl. No.: 09/693,763

(22) Filed: Oct. 20, 2000

(51) Int. Cl.[7] ............................................... B60R 9/045
(52) U.S. Cl. ........................ 224/321; 224/309; 410/105
(58) Field of Search ................................... 224/309, 321; 248/429, 503, 503.1; 410/105, 115, 116

(56) References Cited

U.S. PATENT DOCUMENTS

| | | |
|---|---|---|
| 4,015,760 A | 4/1977 | Bott |
| 4,055,285 A | 10/1977 | Bott |
| 4,106,680 A | 8/1978 | Bott |
| 4,133,465 A | 1/1979 | Bott |
| 4,156,497 A | 5/1979 | Bott |
| 4,274,570 A | 6/1981 | Bott |
| 4,295,587 A | 10/1981 | Bott |
| 4,432,478 A | 2/1984 | Bott |
| 4,501,385 A | 2/1985 | Bott |
| 4,717,298 A | 1/1988 | Bott |
| 4,911,348 A * | 3/1990 | Rasor et al. ................. 224/321 |
| 5,464,140 A * | 11/1995 | Hill ............................. 224/321 |
| 5,826,765 A * | 10/1998 | Rak et al. .................... 224/321 |
| 5,826,766 A * | 10/1998 | Aftanas ....................... 224/321 |
| 5,848,775 A * | 12/1998 | Isomura et al. ......... 248/429 X |
| 5,913,465 A * | 6/1999 | Potter et al. ................. 224/321 |
| 6,182,876 B1 * | 2/2001 | Moliner ....................... 224/321 |
| 6,257,541 B1 * | 7/2001 | Timon et al. ................ 248/429 |
| 6,299,120 B1 * | 10/2001 | Girardi et al. .............. 248/429 |
| 6,299,121 B1 * | 10/2001 | Brault ........................ 248/429 |

* cited by examiner

*Primary Examiner*—Gregory M. Vidovich
(74) *Attorney, Agent, or Firm*—Harness, Dickey & Pierce, PLC

(57) ABSTRACT

A vehicle article carrier apparatus having a pair of elongated support rails which are used to support a pair of bracket assemblies of a cross bar thereon. Each of the support rails form a channel and include a pair of flanges which extend inwardly towards each other and towards a bottom wall of the support rail. A tap plate is disposed within the channel and includes a pair of angled edge portions. The angled edge portions are formed at angles which allow them to rest flush against the flanges when the tap plate is urged into a locked position. This arrangement prevents the support rail from being distorted in the event the tap plate is slightly over-tightened. It also provides an extremely secure clamping arrangement when a bracketed member is in a locked orientation on its associated support rail.

17 Claims, 2 Drawing Sheets

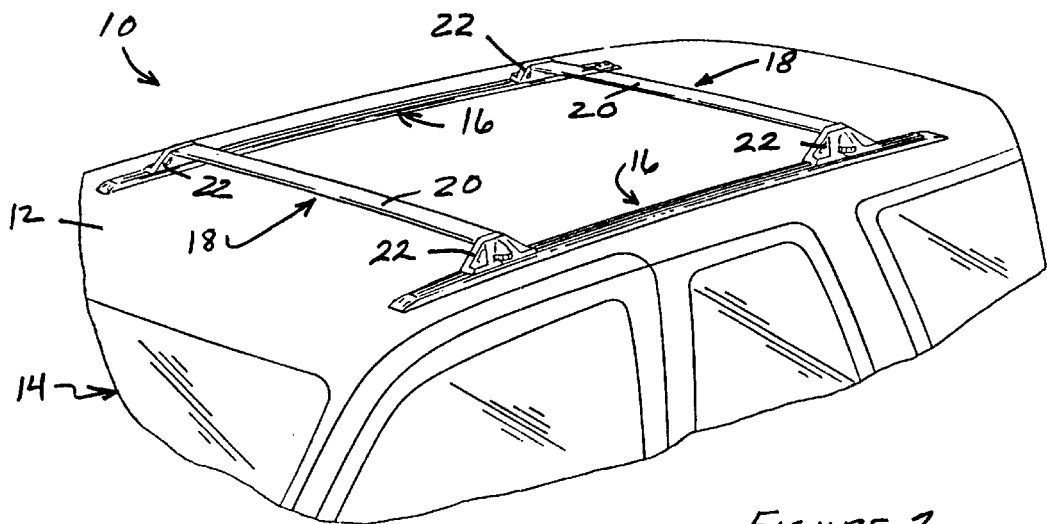
FIGURE 1
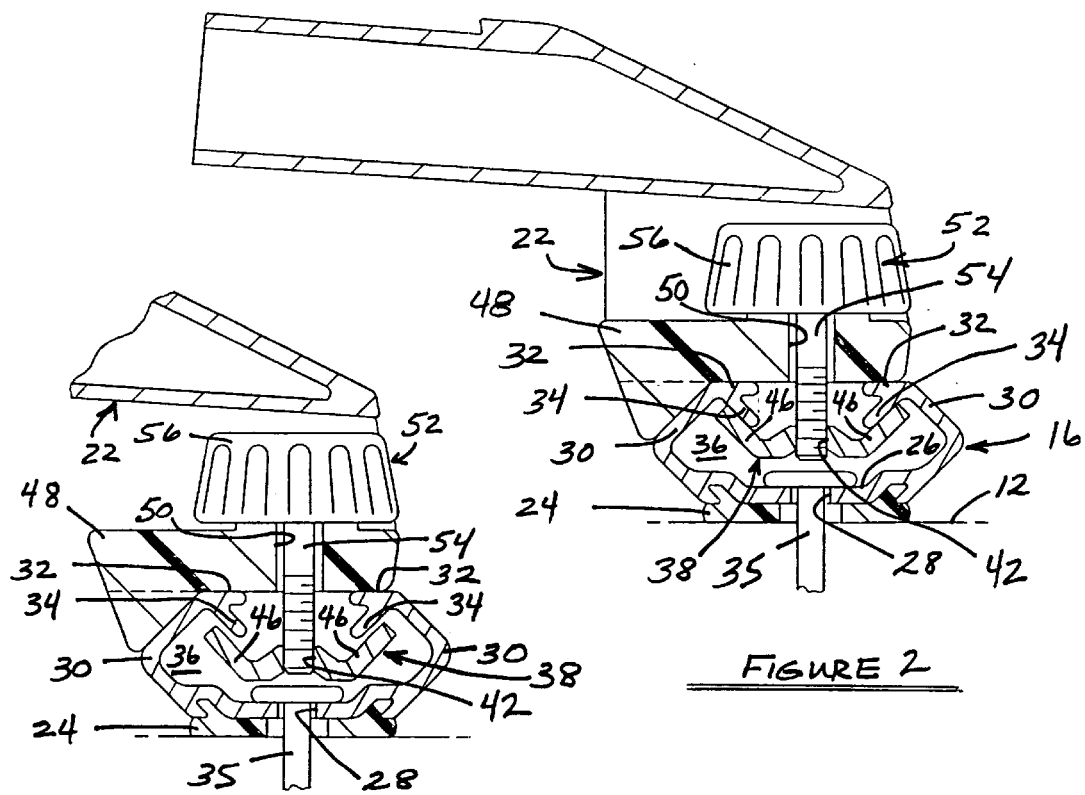
FIGURE 2
FIGURE 3

VEHICLE ARTICLE CARRIER HAVING ANGLED TAP PLATE AND COOPERATING SLAT

TECHNICAL FIELD

This invention relates to vehicle article carriers, and more particularly to a vehicle article carrier incorporating a tap plate having angled edge portions which are adapted to engage with corresponding angled flanges of a slat to enable a bracket assembly to be even more positively secured to the slat.

BACKGROUND OF THE INVENTION

Vehicle article carriers are used in a wide variety of applications for securing articles of various sizes thereon. Typically, a vehicle article carrier includes a pair of slats or side rails that are secured along a major longitudinal length of the vehicle roof or rear deck lid. One or more cross bars having a bracket assembly at each end is secured to the slats or side rails so as to extend perpendicularly between the slats or side rails. Within each slat or side rail is disposed a tap plate. The tap plate may be threadably engaged with a user actuatable, rotatable locking knob or like element which allows the user to effectively lock each end of the cross bar at a desired position along its associated slat or side rail. Thus, the cross bar can be positioned along the slats or side rails as needed to accommodate a variety of articles having widely varying shapes and dimensions.

The tap plate that is typically used with a slat or side rail is a flat, spring steel plate. The tap plate is disposed within a channel of the slat or side rail and typically engages co-planar wall portions of the slat or side rail as the user actuatable locking element is tightened into a locked position. This causes the bracket assembly associated therewith to be effectively clamped by the tap plate to the slat or side rail.

When using a planar tap plate that is adapted to engage with co-planar wall portions of a slat or side rail, however, care must be taken not to over tighten the user actuatable locking element. Overtightening can result in the tap plate tending to "spread" apart the co-planar wall portions of the slat or side rail, thus tending to deform, and potentially damage, the side rail or slat. Accordingly, it would be highly desirable to provide a slat or side rail construction, and a tap plate for use therewith, which cooperatively help to maintain the intended cross sectional shape of the side rail or slat as the tap plate is tightened within the slat or side rail. This would reduce or eliminate the risk of damage to the slat or side rail as the tap plate is tightened.

It would also be highly desirable to provide a slat or side rail construction for use in connection with a tap plate which does not require significant modification to the shape of the side rail or slat. It would further be desirable to provide such a slat or side rail construction which would still allow the slat or side rail to be extruded or roll formed in accordance with traditional manufacturing techniques.

SUMMARY OF THE INVENTION

The above and other objects are provided by a vehicle article carrier in accordance with preferred embodiments of the present invention. In one preferred embodiment the vehicle article carrier includes a pair of support rails which are adapted to be mounted on an outer body surface of the vehicle essentially parallel to one another, and along a major longitudinal length of the vehicle. Each support rail is shaped so as to form a channel. Within the channel of each support rail is disposed a tap plate. The support rails support at least one cross bar having a bracket assembly at each end thereof. Each bracket assembly has a user actuatable locking element which is engaged with a portion of the tap plate of its associated slat once the vehicle article carrier is fully assembled. The user actuatable locking elements are used to clamp bracket assemblies to the support rails at desired positions along the support rails.

Each of the support rails includes a pair of flanges protruding inwardly towards a bottom wall of the slat. Each tap plate includes at least one angled edge portion, and preferably a pair of angled edge portions. The angled edge portions are formed such that they engage flush with the flanges when the tap plate is tightened within its associated slat. Importantly, the engagement of the angled edge portions of the tap plate and the flanges help to ensure that the flanges are not "spread apart" as the tap plate is tightened. This ensures that the cross sectional shape of the slat or side rail is maintained even when its associated bracket assembly is fully clamped thereto.

The tap plate and support rail construction of the preferred embodiment can be employed when the support rail is formed as either a slat or a side rail. In either instance, the inwardly angled flanges and the tap plate having its angled edge portions serve to maintain the intended cross sectional shape of the slat or support rail even when the bracket assembly is clamped tightly thereon.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a vehicle having secured thereon a vehicle article carrier in accordance with a preferred embodiment of the present invention;

FIG. 2 is a cross sectional end view of the slat taken in accordance with section line 2—2 in FIG. 1 showing the bracket assembly in the locked orientation;

FIG. 3 is a view of the bracket assembly of FIG. 2 shown in the unlocked position;

DETAILED DESCRIPTION OF THE PREFERRED EMBODIMENTS

Figure 4:
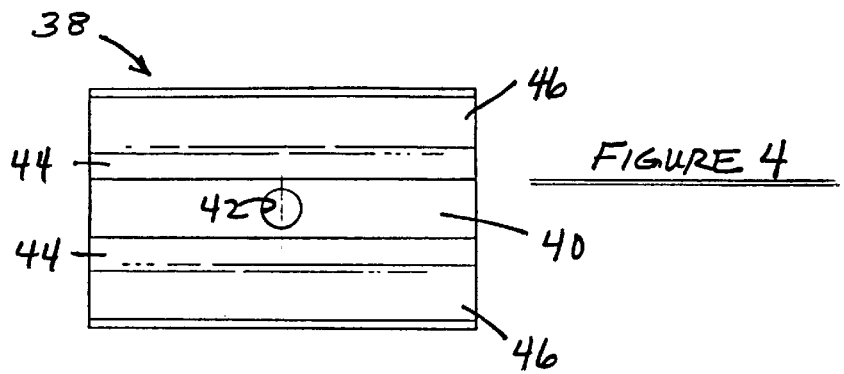
FIG. 4 is a plan view of the tap plate.

Referring to FIG. 1, there is shown a vehicle article carrier apparatus 10 in accordance with a preferred embodiment of the present invention. The apparatus 10 is adapted to be secured to an outer body surface 12 of a motor vehicle 14. While FIG. 1 shows the apparatus 10 secured to a roof area of the vehicle 14, it will be appreciated that the apparatus 10 could just as readily be secured to a liftgate or other area of the vehicle 14 with little or no modification to the apparatus 10.

The apparatus 10 generally includes a pair of elongated support rails 16 which are disposed generally parallel to one another and which extend generally along a major longitudinal length of the vehicle 14. At least one cross bar assembly 18, and preferably a pair of such assemblies 18, are adjustably secured to the elongated support rails 16. Each cross bar assembly 18 includes a cross bar 20 having a bracket assembly 22 disposed at each end thereof. The bracket members 22 support each cross bar 18 elevationally above the outer body surface 12. While the bracket members 22 are indicated in FIG. 1 as all being of identical construction, it will be appreciated that one of the cross bars 18 could be fixedly mounted to the support rails 16 so as to be non-movable.

It will also be appreciated that while the support rails 16 have been illustrated as slats in FIG. 1, that the support rails 16 could just as easily each be formed as side rails and supported elevationally above the outer body surface 12 by a pair of suitable support feet at opposite ends thereof. Thus, the teachings of the present invention are not limited to only support rails in the form of slats, but just as well as to support rails which are formed as side rails.

Referring to FIG. 2, the construction of the support rail 16 and its associated bracket member 22 is shown in greater detail. The support rail 16 is typically mounted on a resilient pad 24 which supports the support rail 16 just slightly above the outer body surface 12 to protect the surface 12 from scratching and to seal out moisture. The support rail 16 includes a bottom wall 26 having an opening 28, a pair of side walls 30, upper support walls 32 and a pair of flanges 34. The flanges 34 extend at an angle inwardly towards one another and towards the outer body surface 12. The flanges 34 extend at an angle of preferably about 30°–60°, and more preferably about 45° from the upper support walls 32. The upper support walls 32 form upper supporting surfaces that are co-planar with one another for supporting the bracket member 22 on the support rail 16. The support rail 16 may be formed from a variety of manufacturing techniques, but is preferably either extruded from aluminum or roll formed from aluminum. Of course, other suitably strong materials could be used besides aluminum such as steel.

Figure 5:
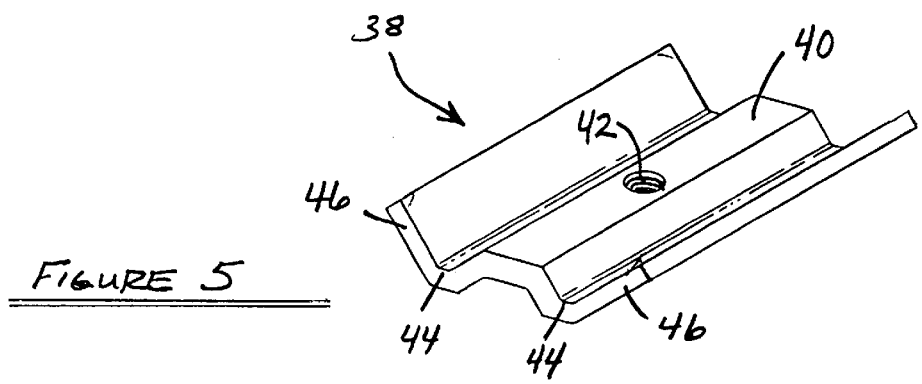
FIG. 5 is a perspective view of the tap plate.

The support rail 16 is secured to the outer body surface 12 by a plurality of conventional fastening elements 35 so that the support rail 16 is held securely against he pad 24 along its entire length. The support rail 16 also forms a channel 36 within which is disposed a tap plate 38. The tap plate 38 is shown in greater detail in FIGS. 4 and 5. With brief reference to FIGS. 4 and 5, the tap plate 38 includes a planar central portion 40 having a threaded aperture 42, a pair of transition portions 44 and a pair of outwardly extending angled edge portions 46. The edge portions 46 are formed at angles such that they engage flush with the flanges 34 of the support rail 16 when the tap plate 38 is drawn into engagement with the flanges 34. The angles of the edge portions 46 may vary considerably but are preferably between about 30°–60°, and more preferably about 45° relative to the planes of the central portions 40. The tap plate 38 may be made from a variety of materials but in one preferred form is manufactured from spring steel. Other suitably strong materials could also be employed.

With further reference to FIG. 2, the bracket assembly 22 includes a housing portion 48 having an opening 50. A user actuatable locking element 52 having a threaded shaft portion 54 extends through the opening 50, and has an enlarged knob portion 56. The enlarged knob portion 56 may be easily grasped with the fingers of one hand and turned. The threaded shaft portion 54 is engaged with the threaded opening 42 of the tap plate 38. Rotational movement of the knob portion 56 in one direction causes tightening of the tap plate 38 against the flanges 34, while rotation in the opposite direction causes the tap plate to be loosened and moved into the orientation shown in FIG. 3.

It is a principal advantage of the present invention that as the tap plate 38 is tightened into the position shown in FIG. 2, the angled edge portions 46 of the tap plate tend to cause the flanges 34 to be urged slightly towards one another. This helps to maintain the cross sectional shape of the support rail 16. It also prevents the upper support portions 32 from being "spread apart" if the tap plate is overtightened. The tap plate 38 and support rails 16 thus form a means by which the bracket member 22 can be securely clamped to the support rail 16 without distorting the cross sectional shape of the support rails 16.

Figure 6:
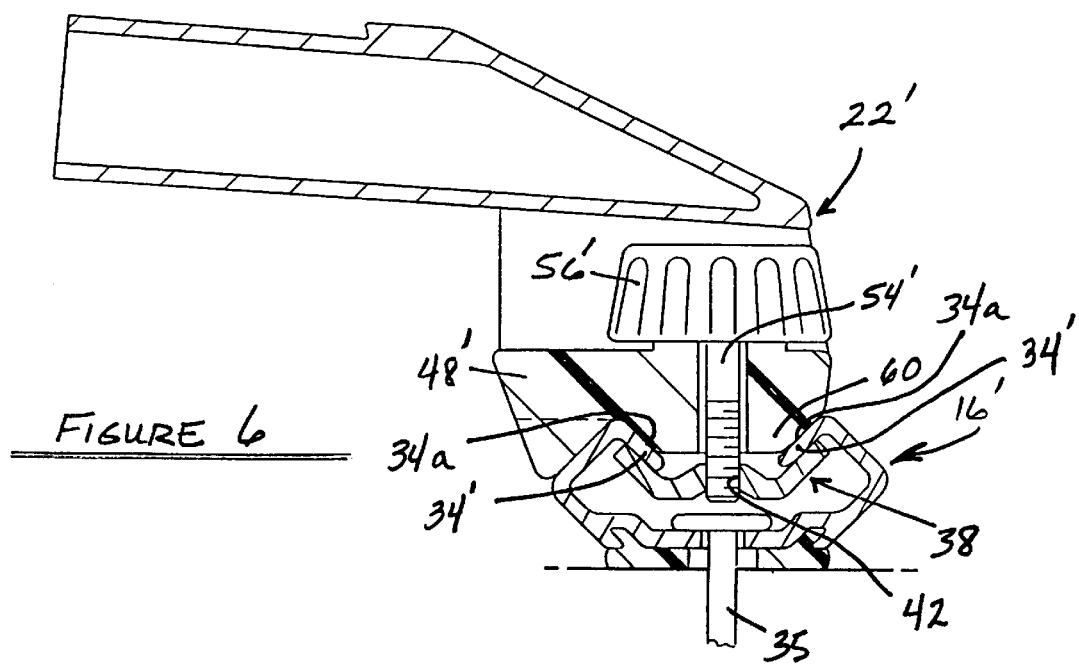
FIG. 6 is an end view of an alternative preferred construction of the bracket assembly for use with the slat and tap plate shown in FIG. 2.

Referring to FIG. 6, there is shown a support rail 16' in accordance with an alternative preferred embodiment of the present invention. An alternative preferred form of the bracket assembly, denoted by reference numeral 22', is also shown. Components common to the embodiment of FIGS. 1–5 are denoted with a prime (') symbol. The support rail 16' is identical in construction to the support rail 16 shown in FIG. 2 with the exception that the upper support surfaces 32 have been eliminated. The bracket member 22' is identical to bracket member 22 with the exception that housing 48' includes a central portion 60 adapted to rest against upper surfaces 34a of the angled portion 34'. In this manner, a clamping action is effected essentially at two points along the support rail 16' where the central portion 60 contacts each of the upper surfaces 34a.

The preferred embodiments described above thus provide a means for securely clamping a bracket member to a support rail while significantly reducing or eliminating the possibility of distorting the cross sectional shape of the support rail in the event the bracket member is overtightened slightly. The preferred embodiments also provide an extremely secure clamping action to be effected without adding any significant additional cost to the overall vehicle article carrier apparatus.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. For a vehicle article carrier having a locking element, a support rail adapted to be supported on or above an outer body surface of a vehicle, said support rail comprising:

an elongated support rail having a bottom wall and a pair of side walls forming an elongated channel;

a pair of flanges respectively extending from each of said side walls inwardly toward said elongated channel; and a tap plate having a pair of angled ends each extending at an angle so as to be generally flush with said flanges when said angled ends are in contact with said flanges, such that said angled ends tend to draw said flanges toward each other when said tap plate is urged into a locked orientation by said locking element.

2. The support rail of claim 1, wherein said tap plate includes a central portion, and wherein said angled ends of said tap plate extend at an angle of about 45 degrees from said central portion.

3. The support rail of claim 1, wherein said support rail includes an upper support surface extending from each of said side walls, and wherein said flanges extend at angles of about 45 degrees from each of said side walls.

4. The support rail of claim 1, wherein said support rail comprises a slat adapted to be secured against said outer body surface.

5. A vehicle article carrier adapted to be secured to an outer body surface of a vehicle to support articles thereon, said vehicle article carrier comprising:

a cross bar for supporting said articles thereon;

a pair of bracket members disposed at opposite ends of said cross bar;

a user actuatable locking member operably associated with at least one of said bracket members;

a pair of elongated support rails adapted to be disposed along a major longitudinal length of said vehicle and generally perpendicular to said cross bar, and operably engageable with said bracket members for supporting said cross bar above said outer body surface, each of said support rails including:

an elongated channel having a pair of flanges projecting inwardly toward a bottom wall of said channel;

a locking element operably associated with said user actuatable locking member, and having a pair of angled edge portions being spaced apart and extending at angles so as to engage generally flush against said flanges when said locking element is in a locked orientation; and wherein said user actuatable locking member, when moved into said locked orientation, causes said locking element to tend to urge said flanges towards each other.

6. The vehicle article carrier of claim 5, wherein said locking element comprises a tap plate.

7. The vehicle article carrier of claim 5, wherein:

said locking element comprises a tap plate having a central threaded opening; and wherein said locking member comprises a threaded shaft engageable with said central threaded opening.

8. The vehicle article carrier of claim 5, wherein said locking element comprises a tap plate, and wherein said flanges extend at angles of about 45 degrees relative to a central portion of said locking element.

9. The vehicle article carrier of claim 5, wherein said user actuatable locking member comprises an enlarged, manually graspable locking knob rotatably disposed on its associated said bracket member.

10. The vehicle article carrier of claim 5, wherein said support rail comprises a slat adapted to be secured against said outer body surface of said vehicle.

11. The vehicle article carrier of claim 5, wherein said support rails each comprise a side rail adapted to be supported above said outer body surface of said vehicle.

12. The vehicle article carrier of claim 5, wherein said support rails each have upper support surfaces, and wherein said flanges extend at approximately a 45 degree angle relative to said upper support surfaces.

13. A vehicle article carrier adapted to be secured to an outer body surface of a vehicle to support articles thereon, said vehicle article carrier comprising:

a cross bar for supporting said articles thereon;

a pair of bracket members disposed at opposite ends of said cross bar;

a pair of user actuatable locking members operably associated with said bracket members and each including a user engageable knob and a threaded shaft;

a pair of elongated support rails adapted to be disposed along a major longitudinal length of said vehicle and generally perpendicular to said cross bar, and operably engageable with said bracket members for supporting said cross bar above said outer body surface, each of said rails including:

a pair of upper support surfaces;

an elongated channel having a pair of flanges projecting inwardly toward said channel and diverging from said upper support surfaces;

a locking element having a central portion threadably engaged with said threaded shaft of an associated one of said user actuatable locking members, and a pair of angled edge portions being spaced apart and extending at angles so as to engage generally flush against said flanges when said locking element is in a locked orientation; and wherein said user actuatable locking member, when moved into said locked orientation, causes said locking element to tend to urge said flanges towards each other to maintain a cross sectional shape of said support rail.

14. The vehicle article carrier of claim 13, wherein said locking element comprises a tap plate, and wherein said angled edge portions extend at an angle of about 45 degrees from said central portion of said tap plate.

15. The vehicle article carrier of claim 13, wherein said support rails each comprise a slat adapted to be secured adjacent said outer body surface of said vehicle.

16. The vehicle article carrier of claim 13, wherein said support rails each comprise side rails adapted to be supported above said outer body surface of said vehicle.

17. The vehicle article carrier of claim 13, wherein said locking element comprises a spring steel locking element.

* * * * *